July 5, 1955    O. REINWALD    2,712,601
MECHANICAL-ELECTRICAL TRANSDUCER
Filed June 6, 1952
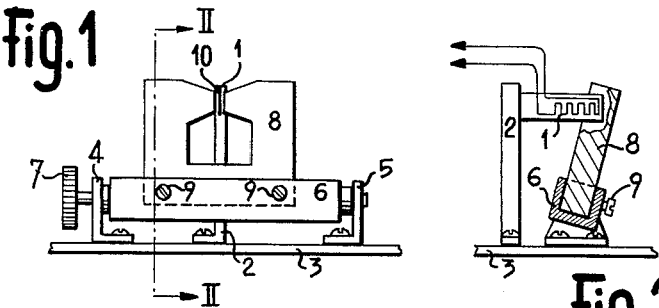
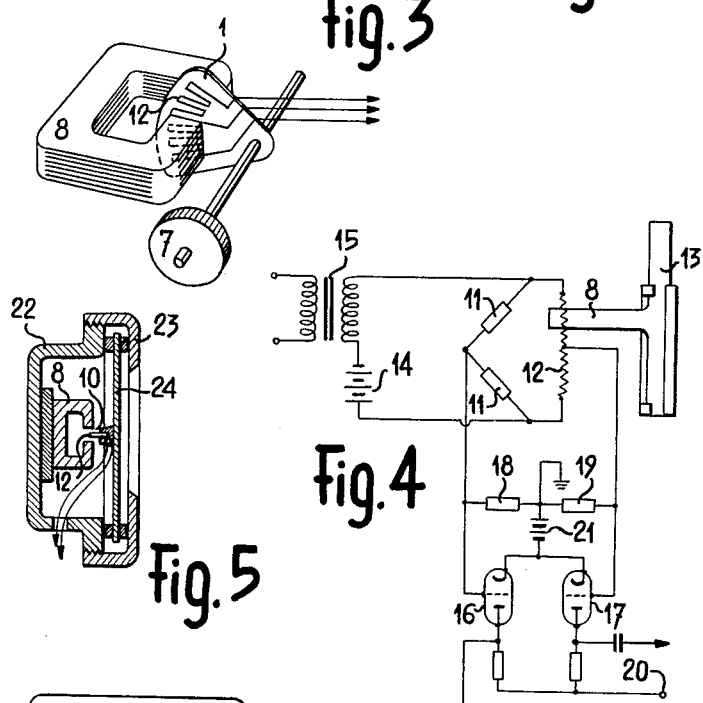
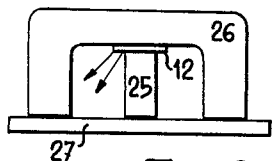
Inventor
OSKAR REINWALD
By *Fritz G. Hochwald*
       Agent

United States Patent Office 2,712,601
Patented July 5, 1955

2,712,601
MECHANICAL-ELECTRICAL TRANSDUCER

Oskar Reinwald, Geneva, Switzerland, assignor to Volt-ohm Processes Limited, Tangier, a company of Tangier Application June 6, 1952, Serial No. 292,069
Claims priority, application Switzerland June 9, 1951

4 Claims. (Cl. 250—27)

The invention has for its subject a mechanical-electrical transformer, that is to say a device enabling a mechanical dimension to be converted into an electrical dimension.

In technology it is often of advantage to dispose of an electric voltage which is a function of a mechanical dimension, such as movement, thickness, pressure and so forth. The mechanical-electrical transformer, forming the subject of the invention, is of simple construction and is characterized in that it comprises a conductor located in a magnetic field, mechanical means being provided for varying the magnetic flux passing through said conductor, the latter being of a material of which the specific resistance varies when it is placed into a magnetic field.

Some forms of construction of the subject of the invention are shown by way of example in the accompanying drawings, wherein:

Fig. 1 is a side view of a first form of construction.
Fig. 2 is a section on the line II—II of Fig. 1.
Fig. 3 shows a form of construction in which the conductor is movable relatively to a magnetic field.
Fig. 4 shows a mounting sensitive to the movement of a member carrying a magnetic circuit.
Fig. 5 shows a mechanical-electrical transformer provided for operating as a microphone.
Fig. 6 shows another form of construction of a mechanical-electrical transformer.

Referring to Figs. 1 and 2, a resistance 1, formed by a film of bismuth held between two layers of insulating material, is secured to a support 2 secured to a base plate 3. The plate 3 also carries two bearings formed by parts 4 and 5 in the form of angle pieces. A part 6, of U-shape, is pivoted in the angle pieces 4 and 5 and carries an operating knob 7 at one of its ends. A magnetic core 8, formed by a permanent magnet, is secured in the U-shaped part 6 by means of a screw 9. The core 8 has a gap 10. The resistance 1 is located in a plane perpendicular to the pivotal axis of the core 8, this plane passing into the air gap 10.

By varying the angular position of the core 8 about its pivotal axis, the relative position of the resistance 1 in the air gap 10 is modified in such a manner that the magnetic flux passing through the said resistance 1 is larger or smaller. As the resistance of bismuth is a function of the magnetic field into which it dips, the resistance of the conductor 1 may be modified by operating the operating knob 7. The transformer described consitutes an adjustable resistance, having no frictional contact, so that parasites due to bad contacts, which are frequent in variable resistances with a slide, are eliminated completely.

It will be understood that the angular position of the magnetic core 8 may be determined for any mechanical dimension to be measured, and that the measurement of the resistance of the conductor 1 thus enables the said dimension to be ascertained. The conductor may be arranged in series with a fixed resistance, in such a manner as to form a voltage divider. The outlet voltage of the divider is a function of the supply voltage of the divider and of the position of the core 8 relatively to the conductor. In the case when large variations in voltage are desired for a small movement of the core 8, it is possible to supply the divider with an alternative voltage, so that the outlet voltage is thus modulated in amplitude in proportion to the position of the core 8. The modulated voltage may be amplified easily by means of any alternating current amplifier before being rectified.

Fig. 3 shows diagrammatically another form of construction in which a bismuth resistance 1 is movable in an air gap of a stationary permanent magnet 8. The resistance is formed by a film of bismuth in the form of a sinuous ribbon 12, held between two layers of insulating material. The resistance is provided with a central tapping point, dividing it into two portions capable of being branched in two contiguous arms of a bridge, as will be described hereinafter, with reference to Fig. 4. The resistance 1 is secured to a shaft provided with an operating knob 7. By operating the knob 7, it is possible to vary the position of the resistance 1 in the air gap of the magnet 8, in such a manner that the magnetic field of the permanent magnet passes more or less through the said portions of the resistance 1. The resistance 1 is so arranged that when one of its portions is completely located in the air gap, the other portion is outside thereof. During movement of the resistance in the air gap, the magnetic flux passing through one of its portions decreases whilst that passing through the other portion increases.

Fig. 4 shows a bridge formed by two resistances 11 and by a conductor 12 of bismuth, having a central tapping point. The conductor 12 is located in the air gap of a permanent magnet 8 mounted on a slide 13, which may be connected to any member of which it is desired to ascertain the position. The bridge is supplied by a source 14 of direct current and by an alternative voltage transmitted by a transformer 15. The outlet voltage of the bridge is applied to the control grid of two tubes 16 and 17, in phase opposition. Each control grid is connected to earth by a resistance 18, 19 respectively, and the cathodes of the tubes are connected to earth by a voltage source 21 of polarisation. The two anodes are connected by anode resistances to an inlet terminal 20 of continuous high voltage. When the magnetic core 8 is located in its central position, that is to say when each portion of the resistance 12 is subjected to the same magnetic flux, the bridge is in equilibrium and the grids of the tubes 16 and 17 are thus only subjected to the polarisation voltage. When the magnetic core is moved so as to tend to move towards the position indicated in the drawing, one portion of the conductor 12 is traversed by a much larger magnetic flux than the other, and its resistance increases whilst that of the other portion decreases. The out of balance of the bridge gives rise to a positive continuous voltage on the grid of the tube 16 and a negative voltage on that of the tube 17, voltages due to the voltage source 14. Said grids also receive, in phase opposition, an alternative voltage of which the amplitude is a function of the out of balance of the bridge. The polarisation of the tubes 16 and 17 is such that when the bridge is in equilibrium, their point of operation is located close to the lower curve of their grid-plate characteristic, so that when the bridge is unbalanced the negative continuous voltage which is applied to a grid produces the locking of the corresponding tube, whilst the continuous positive voltage of the grid of the other tube moves the point of operation of the latter up its range of linearity. The alternative outlet voltage of the bridge is amplified either by the tube 16, or by the tube 17, according to the direction in which the bridge is unbalanced. Preferably the continuous voltage supplied by the source 14 is greater than the peak voltage of the alternative voltage supplied by the transformer 15.

The anode voltages of the tubes 16 and 17 may be amplified in supplementary stages, before being rectified. The rectified voltages may be applied to a measuring instrument, of which the position of the needle varies in proportion to the position of the magnet 8 relatively to the resistance 12. The mounting described above easily permits of transmitting to a distance the indication of the position of the magnet 8, and thus of the member determining this position.

This mounting also permits of observation of vibratory phenomena. The magnet 8 may be connected to a vibrating body in such a manner that the alternative output voltages of the tubes 16 and 17 are modulated in proportion to these vibrations. It will be well understood that the frequency of the alternative supply voltage of the bridge is higher than that of the said vibrations. The voltages delivered by the tubes 16 and 17 may be applied to the deviating plates of an oscilloscope after having been rectified.

Fig. 5 shows a mechanical-electrical transformer provided for operating as a microphone. A permanent magnet 8 is secured in a casing 22 of which the edge is screwed.

A cover 23, having a central opening, is screwed on the casing 22. A diaphragm 24 is clamped between the casing 22 and the cover 23, said diaphragm carrying a resistance 12, which dips partly into the air gap 10 of the permanent magnet 8.

The sounds collected by the microphone produce alternative displacements of the diaphragm and thus of the conductor 12 which then penetrates more or less into the gap 100. The resistance of the conductor 12 varies in proportion to these sounds and it is easy to transform these variations of resistance into variations of voltage or intensity, for example by branching the conductor 12 in series with a resistance and in supplying the whole with continuous current. The conductor 12 may also constitute the arm of a bridge supplied with continuous current.

By slightly modifying the construction of this transformer it is possible to form a hermetic chamber of which one wall is formed by the diaphragm 24. This chamber may be placed in communication with a source of fluid of which it is desired to measure the pressure. By way of example, the chamber may be placed in communication with a cylinder of an internal combustion engine. The pressure obtaining in the cylinder produces a movement of the resistance 12 in the air gap, and the curve of pressure in the cylinder may be observed during the operation of the engine, for example by transmitting the variation in resistance of the conductor 12 into an alternative voltage and applying this voltage to an oscilloscope. It will be understood that when it is desired to measure differences in pressure, a chamber may be provided on each side of the diaphragm 24 so that the deformation of the diaphragm is determined by the difference of the pressures.

In a modification the conductor 12 may be secured to the end of a lever pivoted at a stationary point relatively to the magnetic core 8, the other end carrying a needle, in such a manner as to form a sound reproducing unit or pick-up, of which the operation is similar to that of the microphone hereinbefore described.

The needle carrying lever may also be secured to the microphone shown in Fig. 5, one end of the lever being then secured directly to the diaphragm 24, said lever being pivoted on the cover 23.

Fig. 6 shows a mechanical-electrical transformer which comprises a magnetic core of E-shape. The central limb 25 of the E is formed by a permanent magnet, and is separated from the body 26 of the E by an air gap in which is located a resistance 12 of bismuth. The ends of the limbs of the E, that is to say the poles of the magnetic core, are located in the same plane. A metal sheet 27 is applied against the said poles for closing the magnetic circuit. The resistance of the magnetic circuit depends on the quality and thickness of the sheet 27 so that if the quality of the sheet is known, it is possible to determine its thickness by measuring the resistance of the conductor 12.

Further, the sheet 27 may be covered with a layer of paint or enamel, this layer being placed against the poles of the magnetic core. Knowing the magnetic qualities and thickness of the sheet, it is possible to determine the thickness of the layer, by measuring the resistance 12. This method of measuring is advantageous when it is desired to verify the thickness of the enamel covering the sheet, as it suffices to place the magnetic core on the point at which it is desired to effect the control and to measure the resistance of the conductor 12.

It is also possible to use this mechanical-electrical transformer for measuring the eccentricity of a shaft during its rotation. It suffices to place the poles of the magnetic core in proximity to the shaft. When the latter is not exactly centered, an alternative variation of the resistance of the magnetic circuit is produced and consequently of the resistance 12.

In all the examples described, the magnetic field was supplied by a permanent magnet, but it will be understood that for creating this field, it is possible to provide an exciting wire on the magnetic core. Further, the conductor 12 has always been of bismuth, in the form of a field held between two insulating layers, but it may be of any other shape and of any material of which the specific resistance varies when it is plunged into a magnetic field; for example of antimony, tellurium, germanium, or one of their alloys. However, it is with pure bismuth that hitherto the greatest variations in resistance have been observed for a given variation of the magnetic field.

I claim:

1. A mechanical-electrical transducer, comprising in combination, an electrical bridge having arms, a conductor forming at least one of said arms of said electrical bridge, said conductor being arranged in a magnetic field and consisting at least partly of a material having a specific resistance depending on the magnetic field in which said conductor is arranged, mechanical means for varying the magnetic flux traversing said conductor, a source of direct voltage, a source of alternating voltage connected in series to said direct voltage source so as to yield a combined voltage, said combined voltage being fed to said electrical bridge, and two electron tubes having control grids, respectively, said electrical bridge having an output voltage applied in phase opposition to said control grids of said tubes.

2. A transducer as claimed in claim 1, said electrical bridge having two adjoining arms each formed as a bismuth resistor, a magnetic circuit having an air gap concentrating said magnetic flux, said mechanical means controlling the relative displacement of said magnetic circuit and said bismuth resistor so as to decrease the amount by which one of said resistors is in said air gap and to increase the amount by which the other of said resistors is in said air gap, and vice versa.

3. A transducer as claimed in claim 2, said air gap of said magnetic circuit being displaceable relatively to said conductor.

4. A transducer as claimed in claim 1, said direct voltage having a value being at least equal to the peak value of said alternating voltage, said electron tubes having a grid bias shifting the working points thereof near the lower knees of the grid-anode characteristic thereof.

References Cited in the file of this patent

UNITED STATES PATENTS

| | | |
|---|---|---|
| 543,843 | Biggar | Aug. 6, 1895 |
| 1,596,558 | Sokoloff | Aug. 17, 1926 |
| 2,226,847 | Clark | Dec. 31, 1940 |
| 2,260,589 | Smith | Oct. 28, 1941 |
| 2,335,117 | Harrison | Nov. 23, 1943 |
| 2,599,550 | Fraser | June 10, 1952 |

OTHER REFERENCES

Magnetic Phenomenon, by A. B. Kaufman, Theory and Engineering, November 1951, pages 41, 42 and 43.